United States Patent [19]

Bellos

[11] 3,862,243

[45] Jan. 21, 1975

[54] MIXED OXYALKYLATES EMPLOYED AS ANTIFOAMERS

[75] Inventor: Thomas J. Bellos, Kirkwood, Mo.

[73] Assignee: Petrolite Corporation, Wilmington, Del.

[22] Filed: Feb. 17, 1972

[21] Appl. No.: 227,241

[52] U.S. Cl................ 260/615 B, 210/59, 252/321, 252/358, 423/210, 260/611 B, 260/613 B
[51] Int. Cl........................ C07c 43/04, C07c 43/14
[58] Field of Search.......... 260/615 B, 611 B, 613 B

[56] References Cited
UNITED STATES PATENTS

| | | | |
|---|---|---|---|
| 2,903,486 | 9/1959 | Brown et al..................... | 260/613 B |
| 2,937,104 | 5/1960 | Stephan...................... | 260/615 B X |
| 3,030,426 | 4/1962 | Moseley et al.................. | 260/615 B |
| 3,101,374 | 8/1963 | Patton........................ | 260/615 B X |
| 3,118,000 | 1/1964 | Dupre ........................ | 260/615 B X |
| 3,340,309 | 9/1967 | Weipert....................... | 260/615 B |
| 3,539,519 | 11/1970 | Weimer......................... | 260/615 B |

*Primary Examiner*—Howard T. Mars
*Attorney, Agent, or Firm*—Sidney B. Ring; Hyman F. Glass

[57] ABSTRACT

Oxyethylated then oxybutylated alcohols of the general formula $R(OEt)_n(OBu)_mOH$ where R is a hydrocarbon group, and most preferably a linear alkyl or alkenyl group, and $n$ is a number from about 3 to 30, and $m$ is from about 2 to 20. These oxyalkylated alcohols are employed as antifoamers.

3 Claims, No Drawings

MIXED OXYALKYLATES EMPLOYED AS ANTIFOAMERS

This invention relates to compositions useful in inhibiting foam.

Foams occur as an undesirable incidental feature in many systems. Although some theories for foam formation have been presented, foam inhibition is basically an empirical art.

I have discovered a novel process of reducing, destroying or preventing foam. My process comprises subjecting a foaming or potentially-foaming system to the action of a small proportion of a reagent or antifoamer of the kind herein described, thereby causing the foaming properties of the liquid to be diminished, suppressed or destroyed. In applying my process to the reduction or destruction of a foam, the reagent may be poured, sprayed or added to the body of foam or on top the liquid, as desired; and the foam breaks and is destroyed or reduced as a consequence of such addition of said reagent. Adding the reagent to the liquid underlying such already-formed foam is also practicable. In applying my process to the prevention of foaming, the reagent is admixed in some small proportion with a potentially-foaming liquid, by any desired or suitable procedure. The ability of the system to foam is destroyed or at least materially reduced by such addition of said reagent.

Thus, my reagents may be used to reduce, destroy, or prevent foam. In the appended claims I have used the word "inhibit" to include all these corrective and preventive aspects of my process and reagents. My reagents are useful in controlling foams in many different types of systems. They control foam encountered in gas-treating systems in which a mixture of glycols and alkanolamines is used to dehydrate and purify natural gas; in activated-sludge-process sewerage plants, particularly in aeration basins and elsewhere; in protein adhesives solutions, such as casein and soybean adhesives as used in the plywood industry; in latex adhesives, printing inks; aqueous emulsion paints; etc.

The compositions of this invention have the general formula $$R(OEt)_n(OBu)_mOH$$

where R is a hydrocarbon group such as alkyl, alkenyl, aryl, cycloalkyl, alkaryl, etc., and $n$ is a number from about 3 to 30, such as from about 5 to 25 or from about 3 to 22, but preferably from about 4 to 20, and most preferably about 4 to 12, and $m$ is a number from about 2 to 20, such as from about 5 to 18, but preferably from about 3 to 15 and most preferably from about 3 to 10.

The R group is preferably a linear alkyl group having from about 6–22 carbon atoms, preferably 8–16 carbon atoms.

The alcohol oxyalkylated can be a single alcohol or a mixture of alcohols whose average size falls within the preferred ranges such as from about 6 to about 18 carbon atoms per molecule, and preferably from about 8 to about 16 carbon atoms per molecule. The alcohol component is most preferably of the straight-chain primary type.

The preferred mono-alcohols are linear alcohols such as exemplified by the primary alcohols obtained in accordance with the Ziegler synthesis method of the secondary alcohols prepared by the OXO process. Particularly desirable alcohols are the linear primary alcohols of the "Alfol" type. Broadly inclusive of the latter, as well as the linear secondary alcohols, are those containing from 8 to 14 carbon atoms. Especially useful alcohols within this range are the $C_{10}$–$C_{12}$ alcohols and mixtures thereof.

Oxyalkylates of the foregoing alcohols can be prepared by conventional methods. Either acid or base catalysis is applicable. Base catalysis, however, is preferred. Exemplary of suitable bases is sodium hydroxide. Boron trifluoride is the preferred acid catalyst for effecting condensation.

The general procedure for carrying out oxyalkylation involves adding the requisite amount of ethylene oxide or butylene oxide to the alcohol together with the catalyst selected and heating the reactants to an elevated temperature under autogenous pressure. For example, oxyalkylation can be carried out in a temperature range of from about 320° to 380°F. The preferred temperature range is from about 340° to 360°F. The foregoing temperature ranges are applicable for the preferred catalyst, specifically, sodium hydroxide. When using an acid catalyst, such as boron trifluoride, a lower temperature is to be observed. A range of from about 175° to 220°F. is suitable for such catalysis.

There is a relationship between the carbon length of the R group, the moles of ethylene oxide and the moles of butylene oxide so as to obtain a proper balance of properties so as to optimize antifoaming properties. In general, the greater the carbon content in R the greater the number of moles of ethylene oxide employed. The terminal addition of butylene oxide is a means of balancing the molecule to the desired function.

The compositions of this invention are also biodegradable so that they do not pollute the environment. However, the use of terminal butylene oxide impedes biodegradability for a long enough time to allow the antifoamer to maintain its effectiveness for a sufficiently long period of time.

Antifoamers of this invention are presented in Table I.

TABLE I $R(OEt)_n(OBu)_mOH$

| | ROH | | | $(OEt)_n$ $n$ | $(OBu)_m$ $m$ |
|---|---|---|---|---|---|
| I | ALFOL* | 810 | 1 mole | 8.0 moles | 5.0 moles |
| II | do. | 810 | 1 mole | 8.0 moles | 5.2 moles |
| III | do. | 810 | 1 mole | 9.0 moles | 6.0 moles |
| IV | do. | 810 | 1 mole | 10.0 moles | 7.0 moles |
| V | do. | 12 | 1 mole | 8.0 moles | 5.0 moles |
| VI | do. | 12 | 1 mole | 10.0 moles | 6.0 moles |
| VII | do. | 12 | 1 mole | 8.0 moles | 7.0 moles |
| VIII | do. | 16 | 1 mole | 8.0 moles | 5.0 moles |
| IX | do. | 16 | 1 mole | 10.0 moles | 6.0 moles |
| X | do. | 16 | 1 mole | 12.0 moles | 7.0 moles |
| XI | do. | 16 | 1 mole | 14.0 moles | 8.0 moles |

*ALFOL is a trade name of Continental Oil Company. The number following each in general denotes the average carbon chain length of the alcohol. Thus "Alfol" 810 have an average chain length of 8–10 carbons, and "Alfol" 12 has an average chain length of 12.

The following compositions are presented for comparative purposes to illustrate the effect of the replacement of butylene oxide with propylene oxide.

TABLE II

R(OEt)$_n$(OPr)$_m$OH

| | ROH | | | (OEt)$_n$ n | (OPr)$_m$ m |
|---|---|---|---|---|---|
| XII | ALFOL | 810 | 1 mole | 8.0 moles | 5 moles |
| XIII | do. | 810 | 1 mole | 8.0 moles | 6 moles |
| XIV | do. | 810 | 1 mole | 8.0 moles | 7 moles |
| XV | do. | 810 | 1 mole | 8.0 moles | 8 moles |
| XVI | do. | 12 | 1 mole | 8.0 moles | 7 moles |
| XVII | do. | 12 | 1 mole | 8.0 moles | 8 moles |
| XVIII | do. | 12 | 1 mole | 10.0 moles | 8 moles |
| XIX | do. | 12 | 1 mole | 10.0 moles | 9 moles |

USE AS ANTIFOAMER IN SYSTEMS CONTAINING FOAMING AGENTS

One form of pollution is caused by the misapplication of surfactant type materials or any class of materials that cause foam, for example bactericides, detergents or any formulation containing a foam-causing agent. Pollution of waterways often results from the misapplication of these products due to equipment failure or by foaming over the confines of their application area thereby finding their way into waterways where they are dangerous to human and animal life. It would therefore be advantageous to be able to drastically reduce and/or eradicate this foaming problem, thereby minimizing or eliminating the cause of foam pollution.

I have discovered that the compositions of this invention inhibit foaming when employed with surfactants, emulsifiers, bactericides, lubricants (aqueous) or any compound which foams in water. Unlike many antifoamers, which require heat to activate their antifoaming qualities as in dishwashing where temperatures of 125°–145°F. are required before the antifoam action is exhibited, these antifoamers work at room temperature. Thus, the products of this invention reduce or eliminate foam when blended with surfactants and bactericides, such as quaternary ammonium salts, alkaryl sulfonates, organic sulfates, organic phosphates, etc., all of which cause "billowy" foam when diluted in water and subjected to agitation.

I have found that when compositions of this invention are added to, or formulated with, these products prior to use (for best results) the foam normally generated is drastically reduced or eliminated, and "foam life" is greatly shortened to a point where new foam being generated, for example from a circulating pump, is broken as fast as it is generated. The beneficial defoaming effects are observed both at ambient temperatures and elevated temperatures. The ability to retard, break, suppress, etc., foam appears to be one of acting upon the bubble structures as formed thus causing an unstable bubble matrix system. For example, with foaming agents such as ammonium lauryl sulfate, by employing the antifoamers of this invention the bubble breaking effect takes several seconds to establish itself after which 30–50 ml. of generated foam breaks in less than 30 seconds at 75°F., whereas untreated samples are stable for hours or even days. In general, the predominant foam breaking comes in the form of whole sections of foam collapsing simultaneously, rather than a general melting of the foam, although the latter phenomena may also occur. This is one of its unique properties.

The compositions of this invention are superior and unique because of their foam breaking action at this low temperature range. In addition to these unique properties, they are soluble to totally dispersible in water at ambient conditions. In most instances, the surfactants, foamers, bactericides, etc., present in the system to which they are added, completely solubilize them so that the solution of foamer and foam controller appear clear and homogeneous in some instances and hazy in other instances, depending upon the amount of and particular composition employed.

The butylene oxide terminated products of Table I were compared to the propylene oxide terminated products of Table II with the following results:

The products of Example I through XIX, were blended at 20 percent in two commercial products, TD-1 a commercially available foaming agent used in drilling wells which produces copious foam and XC-370, a commercially available bactericide of the quaternary ammonium salt type which is a high foaming product. TD-1 and XC-370 are commercial products manufactured by Tretolite Division, Petrolite Corporation, St. Louis, Missouri.

| | In 100 ml Graduates 20 Shakes Foam Generated | Foam Life | Temp. |
|---|---|---|---|
| Blend 1 - 1% in tap water | 20 ml. | 10–20 sec. | 17°C. |
| Blend 2 - 1% in tap water | 35–40 ml. | >3 min. | 17°C. |
| TD-1 - 1% in tap water | 35–45 ml. | >3 min. | 17°C. |
| Blend 1 - 20% Example II/80% TD-1 Foamer | | | |
| Blend 2 - 20% Example XII/80% TD-1 Foamer | | | |
| Blend 3 - 1% in tap water | 30 ml. | 20 sec. | 17°C. |
| Blend 4 - 1% in tap water | 40–45 ml | >3 min. | 17°C. |
| XC-370 - 1% in tap water | 45 ml. | >3 min. | 17°C. |
| Blend 3 - 20% Example II/80% XC-370 | | | |
| Blend 4 - 20% Example XII/80% XC-370 | | | |
| TESTS at 52° C. | | | |
| Blend 1 - 1% in tap water | 30 ml. | 10 sec. | 52°C. |
| Blend 2 - 1% in tap water | 35–40 ml. | 15–25 sec. | 52°C. |
| TD-1 - 1% in tap water | 45–50 ml. | 3 min. | 52°C. |
| Blend 3 - 1% in tap water | 35–40 ml. | 15–20 sec. | 52°C. |
| Blend 4 - 1% in tap water | 40–45 ml. | 40–45 sec. | 52°C. |
| XC-370 - 1% in tap water | 40–45 ml. | 1½ min. | 52°C. |

While the propylene oxide terminated products show an increased action at 52°C. over the untreated examples, they are far inferior to the butylene oxide terminated examples at ambient as well as elevated temperatures.

USE IN SEWAGE SYSTEMS

The compositions of this invention are used as antifoamers in sewage systems. In general, sewage is first treated by primary sedimentation and then subjected to biological secondary treatment. There are two main processes utilized for biological secondary treatment, namely,
1. trickling filter process
2. activated sludge process In both of these processes air or oxygen is employed to treat sewage so it can be precipitated or floced and removed from the effluent water.

This is particularly true of the activated sludge process which involves (1) the return of some activated sludge to the aeration tank influent and discharge of excess sludge to digestion, (2) aeration of the sludge-sewage mixture to attain purification, and (3) settling of the aerator tank effluent to remove floc from the effluent.

Large amounts of air are employed in the activated sludge process to (1) transfer oxygen to the sewage to maintain aerobic condition, (2) cause intimate mixing of sewage and floc and, (3) keep the floc in suspension.

Since large amounts of air are employed in the process, foaming is a severe problem.

I have discovered that the compositions of this invention are very effective as antifoamers in the activated sludge process.

FIELD TESTS

I have tested the compositions of Table I in the aeration tanks of the activated sludge process and found them to be more effective than the commercial antifoamers currently used. Specifically, the composition of Example I, Table I, was effective when employed in the aeration tank in concentrations of 200 ppm.

USE AS AN ANTIFOAMER IN ALKANOLAMINE SWEETENING SYSTEMS

Alkanolamine, or amine, sweetening is the most commonly used of the many processes available.

The principle of the amine process rests on the reversible reaction of a weak base with a weak acid to form a water-soluble salt. The reversible nature of these reactions allows regeneration of the amine solution.

These 5 different types of amine sweentening processes are being or have been used:
1. The aqueous monoethanolamine (MEA) process has been most generally used for natural-gas sweetening.
2. The aqueous diethanolamine (DEA) process is used primarily for refinery or manufactured gas sweetening.
3. Glycol-amine processes use either DEA or MEA with a glycol to sweeten and dehydrate the gas stream simultaneously.
4. Aqueous triethanolamine (TEA) systems have already been displaced by MEA and DEA systems.
5. The methyldiethanolamine (MDEA) system is not commercially competitive with the others.

The principal reactions involved in sweetening gas with an aqueous MEA solution are:
1. $2RNH_2 + H_2S \rightleftharpoons (RNH_3)_2S$
2. $(RNH_3)_2S + H_2S \rightleftharpoons 2RNH_3HS$
3. $2RNH_2 + CO_2 + H_2O \rightleftharpoons (RNH_3)_2CO_3$
4. $(RNH_3)_2CO_3 + CO_2 + H_2O \rightleftharpoons 2RNH_3HCO_3$
5. $2RNH + CO_2 \rightleftharpoons RNHCOONH_3R$ Similar equations can be written for the other types of amines.

The reactions proceed to the right at low temperatures and to the left at high temperatures. Hence, if the amine is contacted with the sour gas at a temperature of from 80° to 100° F., the acid gases will be absorbed and react to form the amine salts. If heat is added to this solution, and the temperature raised to 240°–250° F., the reaction is reversed, the acid gases displaced, and the amine regenerated for reuse.

In the purification of gas and gas condensate from gas wells, the gas/condensate is directed to an area of purification called a gas or gasoline plant. A typical plant would consist of numerous towers (columns) which contain individually, an amine, i.e., monoethanolamine (MEA), diethanolamine (DEA), triethanolamine (TEA) and usually a glycol column which succeeds it in order of contact or, the incoming gas flows into the amine column where $CO_2 + H_2S$ are rmeoved from the gas/condensate (raw gas) stream. The gas is then directed through a glycol dehydration where water is removed. The gas is then directed into the line for purchase by suppliers. The operation is more elaborate when condensate is removed; i.e., ethane, propane, butane, etc., these products being removed through fractionation processes. During the course of fractionating the various "cuts" these products are subjected to varying degrees of temperatures and are subjected to gas/-condensate contact with various solutions of which a few have been mentioned. In extracting from the raw gas/condensate, those products which will react with or will be entrapped in the MEA-glycol solutions, there occurs, from time to time, a foam problem. The foam observed in these solutions can be caused by acid-amine salts, i.e., $CO_2$ MEA, etc., natural mercaptans, asphaltines inorganic salts, influx of oil field treatment products (corrosion inhibitors, demulsifiers) or any number of causes of known and unknown origins. Foam becomes a universal problem in these processing plants.

When foam is generated in these plants, it must be controlled. Generally speaking, it is controlled in a number of ways. However, some explanation of the re-processing of the solution which contact these solutions gas/condensates mixtures should be given.

After contacting the raw gas/condensate, the amine and/or glycol solutions are directed through processes which require the heating of these solutions which drive off the $CO_2$ and $H_2S$ from the amine solution. These salts of MEA, etc., are thermally unstable and the acid anhydride portion is flashed off as "acid gas" $CO_2$ and $H_2S$ regenerating the amine. During the processing the amine and/or glycol may be subjected to elevated temperatures, 275° – 450° F. or greater. Gas plant nomenclature calls the amine rich in $CO_2 + H_2S$ salts "rich amine" while the amine solution freed of its $CO_2 + H_2S$, etc., products throughout processing is called "lean amine." The "lean amine" is returned to the contact column and the process starts over again. During the "still" process, the efficiency may drop off because the still is contaminated with solids, etc. The lean amine solution returning from these stills may foam due to its containing decomposed organic products as well as amine salts solids, etc., carried over from the malfunctioning still. In addition, observed foam may be caused by the mere contact of the incoming gases contacting the lean amine. In addition, it has been observed that when incoming raw field gas/condensate contacts the lean amine (processed) which has average temperatures of between 60°–150°F. (depending upon the scheme of the plant operator) some of the liquid condensate will (propane, butane, etc.) be converted to gas upon contacting the warm to hot contact solution. The expansion of these gases in the system greatly reduces the capacity of the column. The expansion and/or conversion of this gas in the column causes foam to form and/or severe bubbling due to expansion of said gases. Since these plants are in balance and require that they remain dynamic for proper operation, the presence of foam requires that the gas flowing into the processing plant be reduced in order to restore its dynamic operation. It would be, therefore, advantageous to maintain the dynamic flow so as to maintain maximum flow of raw gas/condensate to such plants in order to increase their profit margin and reduce shut down time to correct such foaming problems. Usually this requires the plant be shut down and the contaminate to be physically cleaned out.

I have discovered that the compositions of this invention are effective in inhibiting foam present in these gas treating plants. The following compositions $R(OEt)_n(OBu)_mOH$ were found to be particularly effective in alkanolamine systems.

Table III

| Ex. | ROH | $(OEt)_n$ | $(OBu)_m$ |
| --- | --- | --- | --- |
| A | 1 mole "Alfol" 810 | 8.00 moles | 5.0 moles |
| B | do. | 9.00 moles | 5.0 moles |
| C | do. | 9.00 moles | 6.0 moles |
| D | 1 mole Alfol 10-12 | 12.00 moles | 7.0 moles |
| E | 1 mole Alfol 16-20 | 18.00 moles | 8.0 moles |
| F | 1 mole Oleyl alcohol | 18.00 moles | 8.0 moles |
| G | 1 mole Alfol 610 | 7.00 moles | 5.0 moles |
| H | 1 mole Tridecanol | 10.00 moles | 6.0 moles |

The above compositions were tested as follows:
200 ml of "lean" or "rich" amine is added to a 2000 ml graduated cylinder and it is warmed to temperature which approximates a typical MEA contact system at 50°–155°F. Air is bubbled through the solution at such a rate to generate the maximum foam level at which time a stop watch is started. Antifoamer is injected starting at 50 ppm based upon the solution. The foam "crash" is timed and the ability of the anti-foamer to keep the foam down for 5–10min.

The above compositions in concentrations of 100 ppm reduced the foam generated in this system from 100–800 ml of foam to about 25–50 ml of collapsible foam.

FIELD EXAMPLE

An alkanolamine plant having a contact column temperature of 54°F. and a lean amine temperature of 100°F. had a foaming problem.

When treated with 150 ppm of Example A of Table III, foaming was inhibited in a manner which was more effective than the commercial antifoamer previously employed.

The antifoamer is added to the system in amounts sufficient to inhibit foam. That amount will vary depending on the antifoamer, the system, etc. In general, the antifoamer is employed in concentrations of from about 1 to 20,000 ppm, such as about 5 to 10,000 ppm, for example from 10–1,000 ppm, but preferably from about 100–750 ppm.

I claim:

1. A composition of the formula $$R(OEt)_n(OBu)_mOH$$

where R is an alkyl or alkenyl group having 6–22 carbons, OEt is oxyethylene, OBu is oxybutylene, $n$ is from about 3 to 22 and $m$ is from about 3 to 15.

2. The composition of claim 1 where alkyl or alkenyl has about 8 to 16 carbon atoms, $n$ is about 4 to 12 and $m$ is 3 to 10.

3. The composition of claim 2 where R is a linear alkyl group.

* * * * *